Aug. 19, 1952 D. A. BELL 2,607,888

RADIO SIGNAL DISCRIMINATING APPARATUS

Filed Sept. 21, 1945

INVENTOR
David A. Bell
By Ralph B. Stewart
attorney

Patented Aug. 19, 1952

2,607,888

UNITED STATES PATENT OFFICE 2,607,888

RADIO SIGNAL DISCRIMINATING APPARATUS

David Arthur Bell, London, England, assignor to A. C. Cossor Limited, London, England, a British company Application September 21, 1945, Serial No. 617,842
In Great Britain July 24, 1944

8 Claims. (Cl. 250—20)

This invention relates to circuit arrangements for discriminating between two given signal oscillations of neighbouring frequencies. More particularly but not exclusively the invention relates to the separation of a wanted frequency-modulated or phase-modulated signal oscillation from an unwanted signal oscillation of neighbouring carrier frequency. By a signal oscillation is meant an oscillation which is present on the input side of the system will he nill he, not being controlled at its source; thus a wireless receiving aerial is necessarily exposed to all the arriving signal oscillations, and a selection from among these can only be made by provisions within the receiving system.

The invention makes use of a certain phenomenon that has been observed in the behaviour of an amplitude-limiter when a plurality of frequencies is fed to its input. (The term "frequency," where the sense requires, must in this specification be understood as meaning, in accordance with a common ellipsis, an oscillation of a certain frequency which may or may not be modulated in respect of its amplitude, frequency, or phase. This phenomenon is that if the input to the limiter consists of two not very dissimilar frequencies together with a third frequency which is not of substantially greater amplitude than the stronger of said two, then the output will contain images of the two with respect to the third, the amplitude ratio of the images being very much exaggerated over the amplitude ratio of the corresponding inputs.

In accordance with this invention therefore the wanted and unwanted frequencies are applied to an amplitude limiter together with a third frequency which has an amplitude not less than, and preferably not very much greater than, that of the wanted frequency, being stronger than the unwanted; while from the output of the limiter is selected the image frequency of the wanted frequency with respect to the third frequency. The means for selecting said image frequency will probably be no better able to discriminate against the unwanted frequency image than it would have been able to do against the unwanted frequency itself; but the action of the limiter will have been to increase very greatly the difference between the two amplitudes.

The image frequency selected in the output circuit of the limiter is a third order product having a frequency of 2*Fo*—*Fw*, where Fo is the third frequency (the frequency of the local oscillator) and Fw is the frequency of the wanted signal.

The following description relates to the accompanying drawing in which.

Figures 1, 2, 3:
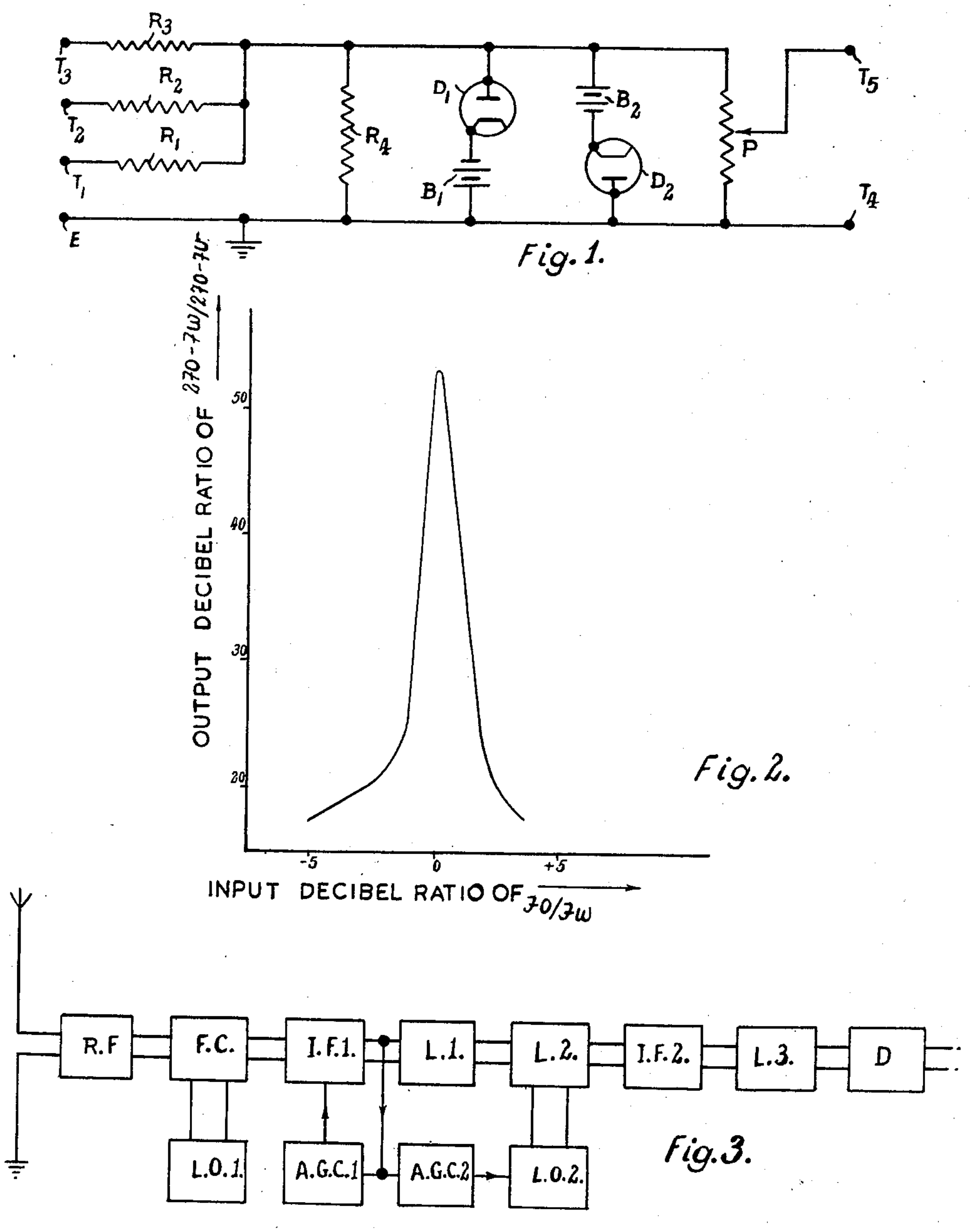
Fig. 1 shows the circuit diagram of an amplitude limiter as used to obtain the experimental results shown graphically in Fig. 2.
Fig. 2 shows graphically the selective phenomenon which can be obtained by the use of a circuit in Fig. 1.
Fig. 3 shows a block diagram of a radio receiver embodying the invention.

The arrangement shown in Fig. 1 is that used experimentally for the purpose of obtaining the curve shown in Fig. 2. The several oscillations are applied across terminals E—T1, E—T2 and E—T3, and hence over individual resistances R1, R2, R3, to a common resistance R4. The total voltage that can be developed across this common resistance R4 is limited by means of the oppositely-arranged diodes D1 and D2 shunting the common resistor in series with biassing batteries B1 and B2. The output from the limiter is fed to the output terminals T4—T5 over a potentiometer P, which in addition to performing its normal volume-control function also has the advantage of reducing the shunting effect of the equipment connected to the output terminals T4—T5, and having a low input resistance.

For the purpose of obtaining the curve shown in Fig. 2, the equipment connected to the output terminals was a wave-analyser. To the input terminals T1, T2, T3, were applied three voltages of different frequencies which may for convenience be designated a wanted frequency F*w*, an unwanted frequency F*u*, and an image-forming frequency Fo, the amplitude of F*w* being greater than that of F*u*. It was then found that the five most important components in the output from the limiter were the three input frequencies, F*w*, F*u* and Fo, together with the image frequencies of F*w* and F*u* with respect to Fo, namely, (2*Fo*—*Fw*) and (2*Fo*—*Fu*). In Fig. 2 the abscissa pertains to input and the ordinate pertains to output of the limiter. Along the abscissa is shown the relationship in decibels between the amplitudes of the image-forming frequency Fo and that of the wanted frequency F*w*; while on the ordinate there is shown the relationship in decibels between the amplitude of the wanted image frequency (2*Fo*—*Fw*) and that of the unwanted image frequency (2*Fo*—*Fu*). It will be seen from this curve that when the image-forming oscillation Fo has an amplitude approximately that of the wanted oscillation F*w*, the image (2*Fo*—*Fu*) of the unwanted oscillation F*u* practically vanishes.

In Fig. 3 is shown by means of a block diagram a superheterodyne radio receiver embodying the invention.

In this receiver the wanted and unwanted frequency-modulated signals picked up by the aerial are, in conventional manner, amplified at R. F., and heterodyned with the output of a local oscillator L. O. 1 in the frequency changer F. C.: the difference beat-frequency oscillations from the output of the frequency-changer are selected and amplified in a first intermediate frequency amplifier I. F. 1. The output from the intermediate frequency amplifier I. F. 1 is passed through a first limiter L1, so that, in accordance with the known functioning of a limiter, if the ratio of the wanted intermediate frequency amplitude to the unwanted intermediate frequency amplitude is A:B on the input side of the limiter L1, that ratio will appear as $A^2:B^2$ on the output side. A second function of the limiter L1 is to keep the signal at a fairly constant level, so avoiding the necessity of having the amplitude of L. O. 2 variable over a wide range. The oscillations are now mixed with the output of a second local oscillator L. O. 2 and the resultant is applied directly to a second limiter L2. The second local oscilator L. O. 2 has a frequency fairly near to, but not within, the pass-band of the first intermediate frequency amplifier I. F. 1. The output of the second limiter L2 is applied to a second intermediate-frequency amplifier I. F. 2, having a pass-band which is the image of that of I. F. 1 with respect to the frequency of the second local oscillator L. O. 2.

The amplitude of the second local oscillation is so adjusted that the image of the unwanted signal from the output of the first I. F. amplifier has negligible amplitude in the output of the second limiter L2, that is, the image frequency to be rendered negligible in the output of the second limiter is the third order frequency of $2Fo-Fu$. The amplitude necessary for this purpose will vary with those of the wanted and unwanted output signals of the first I. F. amplifier. These signal amplitudes will preferably be controlled by an automatic gain control system, of which the branch A. G. C. 1 operates negatively, i. e. to decrease the gain as the signal strength increases. It is preferred that the amplitude of the second local oscillation should also be controlled by the same automatic gain control system, the branch A. G. C. 2 operating positively, i. e. to increase the strength of the local oscillator L. O. 2 as the signal strength increases. The automatic gain control A. G. C. 1 is an alternative to the limiter L1 in respect of the second function of the limiter mentioned above.

The image of the wanted signal will have variable amplitude in the output circuit of the limiter if there is variation in amplitude of either input to first limiter. After amplification in the second I. F. amplifier, therefore, it is passed through a third limiter L3 before application to a frequency-discriminator and demodulator D.

The limiter need not be restricted to the arrangement shown in Fig. 1, but may be of any other known type; for example, a type of limiter commonly used in frequency-modulation receivers is the "overloaded pentode," consisting of a pentode amplifying valve operated under suitable conditions of electrode potentials and anode load impedances.

I claim:

1. A circuit arrangement for discriminating between two signal oscillations $Fw$ and $Fu$ of neighbouring frequencies, $Fw$ having a larger amplitude than $Fu$, said circuit comprising an amplitude limiter, means for feeding said signal oscillations to said limiter, a generator of a third oscillation $Fo$, means supplying oscillations from said generator to said limiter of an amplitude substantially equal to the amplitude of said signal oscillation $Fw$, and means for selecting from the output of said limiter oscillations of a frequency of $2Fo-Fw$.

2. A receiver for a signal oscillation of a frequency $Fw$ comprising, in combination, an amplitude limiter, a local oscillator of a frequency $Fo$, means for supplying oscillations from the local oscillator and said signal oscillation to said amplitude limiter, and an output circuit for said amplitude limiter tuned to select oscillations of a frequency $2Fo-Fw$, and means for making the amplitude of the oscillations supplied from said local oscillator to said limiter approximately equal to the amplitude of said signal oscillation.

3. A receiver according to claim 2 in which said amplitude limiter comprises a pair of oppositely-arranged diodes.

4. A receiver according to claim 3 in which said diodes are arranged in shunt across a resistance across which the wave oscillations are developed as voltages.

5. A receiver according to claim 2 and including a second amplitude limiter connected ahead of said first mentioned limiter to maintain the amplitude of the signal applied to said first limiter within predetermined limits.

6. A receiver according to claim 2 and including a signal amplifier preceding said amplitude limiter, and an automatic gain control system operating negatively upon said signal amplifier to maintain the signal amplitude applied to said limiter within predetermined limits.

7. A receiver according to claim 6, wherein said means for making the amplitude of said oscillations from said local oscillator approximately equal to the amplitude of said signal oscillation comprise an automatic gain control for controlling the amplitude of said oscillations from said local oscillator and connected to respond positively to the amplitude of said signal oscillation.

8. A circuit arrangement for discriminating between two signal oscillations $Fw$ and $Fu$ of neighboring frequencies, $Fw$ having a larger amplitude than $Fu$, said circuit comprising an amplitude limiter, means for feeding said signal oscillations to said limiter, a generator of a third oscillation $Fo$, means for making the amplitude of said third oscillation approximate to that of said signal oscillation $Fw$ to within about $\pm 1$ decibel, means for feeding said third oscillation to said limiter, and means for selecting from the output of said limiter oscillations of frequency $2Fo-Fw$.

DAVID ARTHUR BELL.

REFERENCES CITED

The following references are of record in the file of this patent:

UNITED STATES PATENTS

| Number | Name | Date |
|---|---|---|
| 1,504,600 | Brackett | Aug. 12, 1924 |
| 1,813,923 | Heising | July 14, 1931 |
| 2,085,791 | Carlson | July 6, 1937 |
| 2,086,602 | Caruthers | July 13, 1937 |
| 2,087,063 | McCutchen | July 13, 1937 |
| 2,088,432 | Peterson | July 27, 1937 |
| 2,094,625 | Thompson | Oct. 5, 1937 |
| 2,116,501 | Armstrong | May 10, 1938 |
| 2,144,935 | Van Roberts | Jan. 24, 1939 |
| 2,166,995 | Koch | July 25, 1939 |
| 2,212,338 | Bown | Aug. 20, 1940 |
| 2,214,929 | Koschmieder | Sept. 17, 1940 |
| 2,290,553 | Haantjes | July 21, 1942 |
| 2,362,898 | Gilman | Nov. 14, 1944 |
| 2,363,288 | Bell | Nov. 21, 1944 |
| 2,388,200 | Willmotte | Oct. 30, 1945 |